US008719246B2

(12) United States Patent
Williams et al.

(10) Patent No.: US 8,719,246 B2
(45) Date of Patent: May 6, 2014

(54) GENERATING AND PRESENTING A SUGGESTED SEARCH QUERY

(75) Inventors: Robert Williams, Seattle, WA (US); Nitin Agrawal, Redmond, WA (US); Farid Hosseini, Redmond, WA (US); Sanaz Ahari, Bellevue, WA (US); Maxim Stepin, Redmond, WA (US); Jason Bolla, Snoqualmie, WA (US); Bo-June Hsu, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 357 days.

(21) Appl. No.: 12/824,879

(22) Filed: Jun. 28, 2010

(65) Prior Publication Data

US 2011/0320470 A1 Dec. 29, 2011

(51) Int. Cl.
*G06F 17/30* (2006.01)
*G06F 7/00* (2006.01)

(52) U.S. Cl.
CPC ................................ *G06F 17/30864* (2013.01)
USPC .......................................... 707/706; 707/713

(58) Field of Classification Search
None
See application file for complete search history.

(56) References Cited

U.S. PATENT DOCUMENTS

| | | | | |
|---|---|---|---|---|
| 6,006,225 | A * | 12/1999 | Bowman et al. | 1/1 |
| 7,680,778 | B2 | 3/2010 | Middha | |
| 8,145,636 | B1 * | 3/2012 | Jeh et al. | 707/736 |
| 2007/0050339 | A1 | 3/2007 | Kasperski | |
| 2007/0162422 | A1 | 7/2007 | Djabarov | |
| 2008/0109401 | A1 * | 5/2008 | Sareen et al. | 707/3 |
| 2008/0243487 | A1 * | 10/2008 | Dayan et al. | 704/10 |
| 2009/0083232 | A1 | 3/2009 | Ives | |
| 2009/0094223 | A1 * | 4/2009 | Berk et al. | 707/5 |
| 2009/0248669 | A1 * | 10/2009 | Shetti et al. | 707/5 |
| 2009/0313572 | A1 | 12/2009 | Paek | |
| 2009/0327236 | A1 | 12/2009 | Denney | |

OTHER PUBLICATIONS

White, Ryen W., et al.,Studying the Use of Popular Destinations to Enhance Web Search Interaction—Published Date: 2007 http://www.dcs.gla.ac.uk/courses/teaching/mscweb/rrcs/papers/IR/White07.pdf.

Lin, Jimmy, et al., Question Answering from the Web Using Knowledge Annotation and Knowledge Mining Techniques—Published Date: 2003 http://kuec.sci.ku.ac.th/KM/Paper/KManage/QA%20from%20K%20annotation%20and%20K%20mining.pdf.

Brill, Eric, et al., Data-Intensive Question Answering—Published Date: 2002 http://citeseerx.ist.psu.edu/viewdoc/download?doi=10.1.1.113.5495&rep=rep1&type=pdf.

Abasolo, Jose Maria, et al., Melisa. An Ontology-based Agent for Information Retrieval in Medicine.—Published Date: 2000 http://citeseerx.ist.psu.edu/viewdoc/download?doi=10.1.1.28.6406&rep=rep1&type=pdf.

Schaefer, Andre, et al., Active Support for Query Formulation in Virtual Digital Libraries: A case study with Daffodil—Published Date: 2005 http://www.is.informatik.uni-duisburg.de/bib/pdf/ir/Schaefer_etal:05.pdf.

* cited by examiner

*Primary Examiner* — Fred I Ehichioya
*Assistant Examiner* — Hasanul Mobin
(74) *Attorney, Agent, or Firm* — Dave Ream; Doug Barker; Mickey Minhas

(57) ABSTRACT

The present invention is directed to presenting a suggested search query. Responsive to receiving a user-devised search parameter, a suggested search query is identified. The user-devised search parameter might have been previously received by a search system, or alternatively, might be a unique query that has not been previously received. A suggested search query might be generated using various techniques, such as by applying an n-gram language model. A classification of the suggested search query is determined, and the suggested search query is presented together with a visual indicator, which signifies the classification.

18 Claims, 5 Drawing Sheets

GENERATING AND PRESENTING A SUGGESTED SEARCH QUERY

BACKGROUND

When trying to find a computer resource (e.g., file or webpage) or information related to a topic, a user often executes a search, such as a local search of a computer or a search of networked computers (e.g., using the Internet). For example, the user might submit a user-devised search query having a set of terms (e.g., characters, words, numbers, symbols, etc.) that the user believes are relevant to the computer resource. However, some user-devised search queries do not enable a search system to efficiently locate information of interest to the user. Moreover, some users are not sure what resources or information they are looking for. As such, it can be helpful to provide a user with suggested search queries, which the user can select instead of manually submitting a user-devised search query. In addition to providing a suggested search query, it can be helpful to provide additional information about the suggested search query, such as information that signifies what type of search results might be provided if the suggested search query is submitted.

SUMMARY

Embodiments of the invention are defined by the claims below, not this summary. A high-level overview of various aspects of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

The present invention is directed to presenting a suggested search query. One embodiment includes, responsive to receiving a user-devised search parameter, identifying a suggested search query. The parameter might have been previously received by a search system, or alternatively, might be a unique query that has not been previously received. Pursuant to the present invention, a suggested search query might be generated using various techniques. In one embodiment, an n-gram language model is used to generate the suggested search query. A classification of the suggested search query is determined, and the suggested search query is presented together with a visual indicator, which signifies the classification.

BRIEF DESCRIPTION OF THE DRAWINGS

Illustrative embodiments of the present invention are described in detail below with reference to the attached drawing figures, wherein.

DETAILED DESCRIPTION

The subject matter of embodiments of the present invention is described with specificity herein to meet statutory requirements. But the description itself is not intended to necessarily limit the scope of the claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

Figure 2:
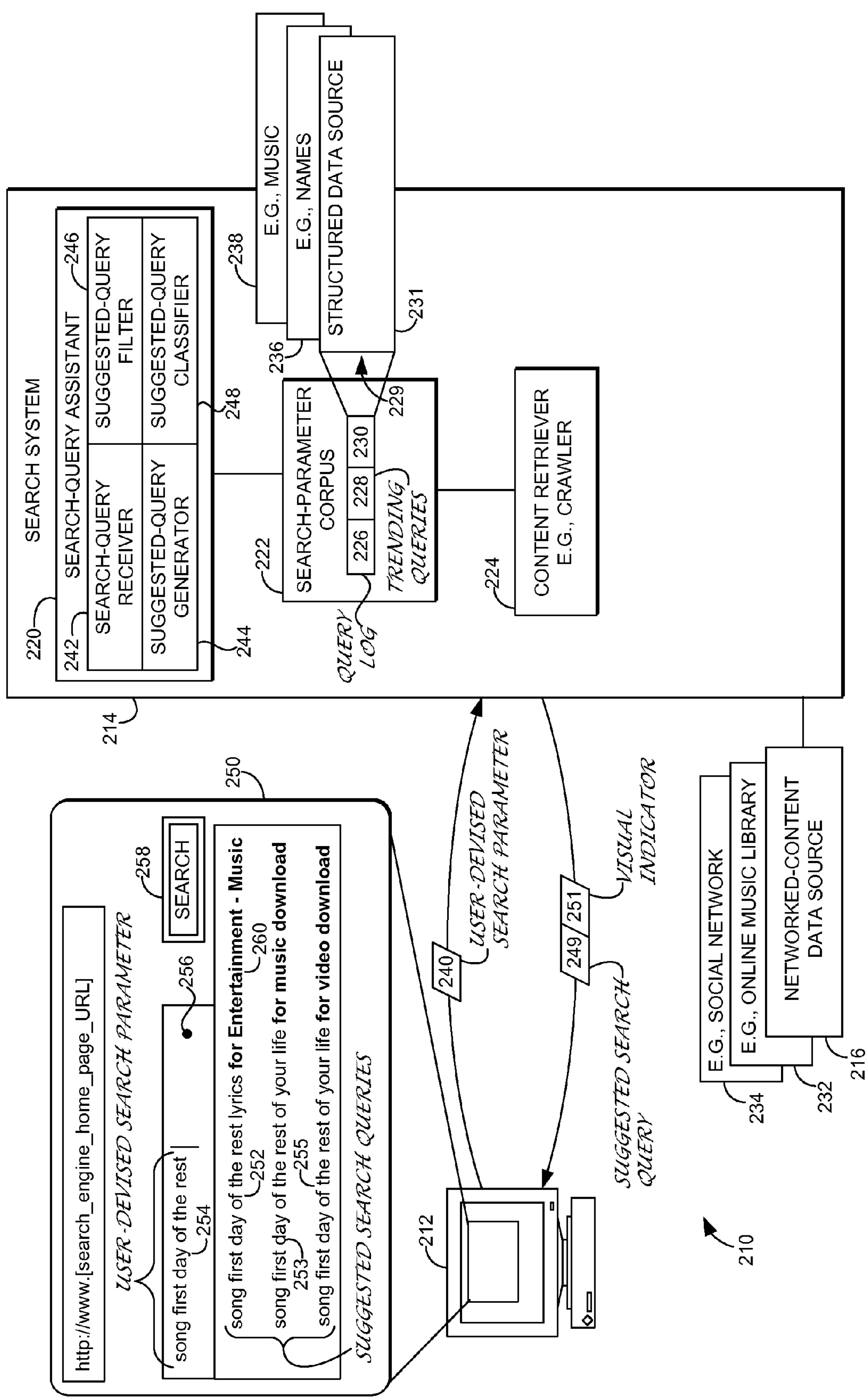
FIG. 2 is a block diagram of an exemplary operating environment in accordance with an embodiment of the present invention.

Generally, embodiments of the present invention are directed to presenting a suggested search query. A suggested search query is a set of search parameters that is presented as an option for a user to select to be submitted to a search system (e.g., search engine). Often, a suggested search query represents a set of parameters (e.g., numbers, characters, words, etc.) that is suggested before a user finishes inputting a user-devised search query. For example, FIG. 2 depicts a screen shot 250 in which a suggested search query 252 is presented. That is, a user-devised search parameter 254 has been inputted in a search-query field 256, and even though the user might not have finished inputting a complete user-devised search query or a search button 258 might not have been selected, suggested search query 252 is presented as an option to be submitted to the search system. A suggested search query might be generated using various techniques. In one embodiment, an n-gram language model is used to generate the suggested search query. Moreover, in an embodiment of the present invention, suggested search query 252 is presented together with a visual indicator 260, which signifies a classification of suggested search query 252.

Figure 1:
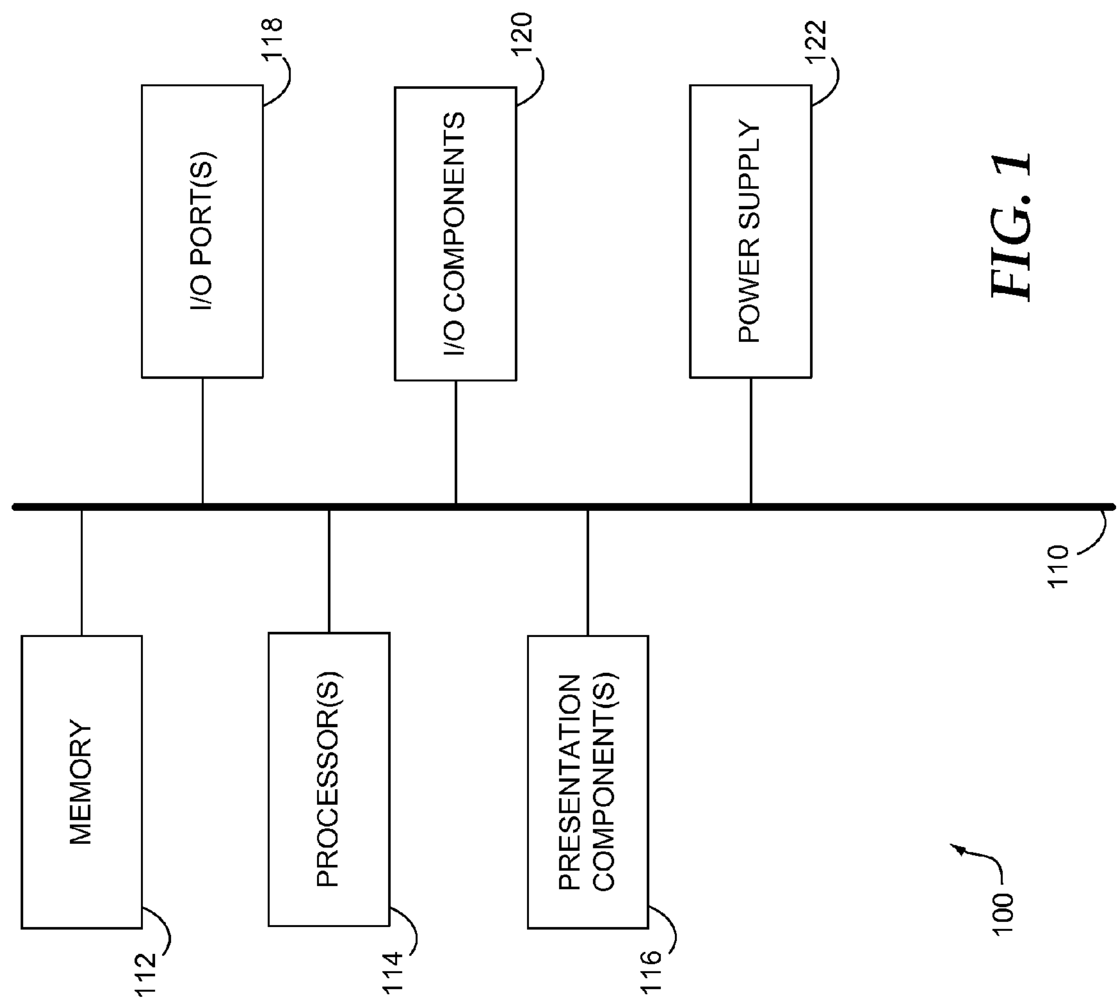
FIG. 1 is a block diagram depicting an exemplary computing device suitable for use in accordance with embodiments of the invention.

Having briefly described embodiments of the present invention, FIG. 1 is now described in which an exemplary operating environment for implementing embodiments of the present invention is shown and designated generally as computing device 100. Computing device 100 is but one example of a suitable computing environment and is not intended to suggest any limitation as to the scope of use or functionality of invention embodiments. Neither should the computing device 100 be interpreted as having any dependency or requirement relating to any one or combination of components illustrated.

Embodiments of the invention might be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. Embodiments of the invention might be practiced in a variety of system configurations, including handheld devices, consumer electronics, general-purpose computers, more specialty computing devices, etc. Embodiments of the invention might also be practiced in distributed computing environments where tasks are performed by remote-processing devices that are linked through a communications network.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

With reference to FIG. 1, computing device 100 includes a bus 110 that directly or indirectly couples the following devices: memory 112, one or more processors 114, one or more presentation components 116, input/output ports 118, input/output components 120, and a power supply 122. Bus 110 represents what might be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. By way of example, computer-readable media might comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors 114 that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Referring now to FIG. 2, an exemplary operating environment suitable for practicing an embodiment of the invention is depicted and identified generally by reference numeral 210. Environment 210 includes a client 212, a search system 214, and a networked-content data source 216. Components 212, 214, and 216 communicate using a network (not shown), such as the Internet. For example, client 212 might communicate with search system 214 when initiating a search query, and search system 214 might communicate with client 212 when providing a suggested search query or when providing search results. Moreover, search system 214 might communicate with networked-content data source 216 when indexing webpage content. Other instances of exchanging information between components 212, 214, and 216 are described in more detail hereinafter.

In an embodiment of the present invention, client 212 is a computing device, such as computing device 100 described with respect to FIG. 1. Client 212 might include any of a variety of computing devices, such as a desktop, laptop, notebook, mobile communications device, and hand-held computing device. In a further embodiment, client 212 allows a user (not shown) to input a search parameter or a search query, receive suggested search queries, and receive search results. For example, a user might input user-devised search parameter 254 into search field 256. A search field might be utilized in a variety of applications, such as a search-engine homepage, a browser toolbar, and a webpage search box.

Screen shot 250 is exemplified to illustrate various concepts related to the present invention. For example, search parameter 254 represents a user-devised search parameter that is being input into search field 256. "User-devised search parameter" refers to one or more search parameters (e.g., characters, words, numbers, symbols, etc.) that are entered by a user, such as by making keystrokes using an input device (e.g., keyboard, touch-sensitive surface, etc.) or by using a voice-recognition component. User-devised search queries are distinguishable from suggested search queries (e.g., suggested search query 252), which are formulated and provided by a computer system (e.g., search system 214) and can be selected by a user for submission to a search system.

In a further embodiment, search system 214 includes various components, including a search-query assistant 220, a search-parameter corpus 222, and a content retriever 224. Search-parameter corpus 222 maintains search parameters from various sources. For example, search-parameter corpus 222 includes information 226, information 228, and information 230. Information 226 is labeled as a "query log," which might include a log of all received search queries. For example, once a search query is received more than a threshold number of times (e.g., five times), search system 214 might store the search query in the query log. However, a query log might also track all received search queries, regardless of whether a search query is received more than a threshold number of times. In addition to received search queries, a query log might also track suggested search queries that search-query assistant 220 provides as options to be submitted to a search system.

Search-parameter corpus 222 also includes information 228, which is labeled as "trending queries." A trending query might include a particular search query that has been recently received by search system 220 in a quantity that represents a significant increase from an average number of submissions of that particular search query. For example, a product search (e.g., "Acme Beef") for a product might maintain an average submission rate; however, if the product were subjected to a massive recall, the product search might be deemed a trending query if the submission rate significantly increased over a relatively short period of time.

In a further embodiment, search-parameter corpus 222 includes information 230, which is depicted in an exploded view 229 for illustrative purposes. Exploded view 229 depicts an embodiment in which information 230 includes a structured data source 231. In an embodiment of the present invention, structured data source 231 includes indexed content that is retrieved from a networked data source 216, such as a content server. For example, content retriever 224 might include a customized crawler that is programmed to recognize and retrieve certain information types from networked-content data source 216. That is, using content retriever 224, search system 214 retrieves information 230 from networked-content data source 216, and stores the information 230 in a structured data source to facilitate efficient referencing. FIG. 2 depicts that an exemplary networked-content data source includes an online music library 232, such that an exemplary structured data source might include music structured data source 238. Music structured data source 238 might include a structured index of song titles, lyrics, artists, etc. FIG. 2 also depicts that an exemplary networked-content data source includes a social network 234, such that an exemplary structured data source might include names structured data source 236. Names structured data source 236 might include a structured index of first, middle, and last names, together with other demographic information. In one embodiment, other information categories that might be stored in a structured data source include categories that describe a wide variety of subjects, which might not appear as a search parameters with a high frequency. Examples of such categories include medical terminology, movie information, patent information, and geographical locations In a further embodiment, content retriever 224 is programmed indicate a classification of information that it retrieves, such that the information can be maintained (e.g., in corpus 222) in a manner that indicates the classification. For example, if retrieved information includes a medical-related information (e.g., illnesses, anatomy terms, pharmaceutical compounds, etc.) the classification (e.g., medical) can be stored together with the medical-related information. By maintaining information in a manner that indicates a classification, when the information is referenced at a future instant in time, the classification can also be referenced.

Structured data source 231 provides a trusted source of information. That is, an embodiment of the present invention allows more reliance to be applied to information indexed in structured data source, as opposed to information retrieved from a log of user-derived search queries. Such reliance stems from the fact that information stored in structured data source has been retrieved from other known sources (e.g., websites) and has been interpreted (such as by a crawler). For example, information retrieved from structured data source 231 might not be subject to filters through which other information must pass. An exemplary filter includes an adult-term filter. For example, the sequence "sex and the city" might be blocked if it were generated from a query log, since it includes the word "sex." However, structured data source 231 might include in a "movies" structured data source (not shown), information related to the movie "sex and the city." In such an example, if the sequence "sex and the city" were referenced in structured data source 231, the sequence might be allowed to pass the adult-filter term.

As will be described in more detail below, search-query assistant 220 functions to provide suggested search queries to client devices. As previously described, a suggested search query is a set of search parameters that is presented as an option for a user to select to be submitted to a search system (e.g., search engine). Often, a suggested search query represents a set of parameters (e.g., numbers, characters, words, etc.) that is suggested before a user finishes inputting a user-devised search query. For example, based on user-devised search query 254, search-query assistant 220 might reference parameters stored in corpus 222 to identify a suggested search query, which might assist with locating sought-after information. In an embodiment of the present invention, search-query assistant 220 represents a component that enables search system 214 to provide suggested search query 252.

In a further embodiment, search-query assistant 220 includes a search-query generator 244, which functions to generate suggested search queries. For example, search-query generator 244 might generate a suggested search query by retrieving the query from corpus 222. Alternatively, search-query generator 244 might generate a suggested search query by formulating a new (i.e., unique) suggested search query from parameters that are already stored in corpus 222. That is, although search-parameter corpus 222 includes a selection of search parameters that might be suggested, search-parameter corpus 222 might not maintain an all-inclusive listing. As a result, search-query generator 244 functions to expand the parameters stored in search-parameter corpus 222. In one embodiment, search-query generator 244 generates parameters to be maintained in corpus 222 in response to receiving a unique user-derived search parameter (e.g., 254). That is, if user-derived search parameter 254 is not recognized within corpus 222, search-query generator 244 might generate a unique suggested search query (i.e., not already stored in corpus 222) in real time. Alternatively, search-query generator 244 actively processes parameters stored in corpus 222 to generate additional suggested parameters to be stored in corpus 222 and made available at a future instant in time. By actively processing parameters in corpus 222, search-query generator 244 effectively expands parameters provided by query logs, trending queries, and structured data source 231.

In an embodiment of the present invention, search query generator 244 generates parameters (e.g., suggested search queries) by applying an n-gram language model to parameters stored in corpus 222. An n-gram is a sequence of n terms (e.g., word, word fragment, character, etc.), and an embodiment of the present invention is directed to predicting a likelihood that a term will appear next in a sequence (e.g., user-derived search parameter or already stored parameter in corpus 222) based on known usage of the term. In a further embodiment, a usage history of the term is based on usage of the term within search-parameter corpus 222. For example, a sequence of words represented as n−1 might be completed by word A, word B, word C, word D, word E, or a combination thereof. That is, a usage history (e.g., search-parameter corpus) might reflect that ABC followed n−1 10 times; AD followed n−1 7 times; BEC followed n−1 5 times; and C followed n−1 3 times. Using these values, a probability can be calculated that predicts a likelihood that a particular sequence of words will appear after n−1. In one embodiment, a formula used to calculate probability is $$p(w \mid h) = \frac{\#(hw)}{\sum_{w'} \#(hw')} \qquad \text{Formula A}$$

Applying this formula a prediction can be made as to the likelihood that, when n−1 appears, the next word or word sequence will be ABC, AD, BEC, or C. For example, $$p(A) = \frac{\#(A)}{\#(A) + \#(B) + \#(C) + \#(D)} = \frac{17}{25} \qquad \text{Example 1}$$

$$p(B \mid A) = \frac{\#(AB)}{\#(AB) + \#(AD)} = \frac{10}{17} \qquad \text{Example 2}$$

A further embodiment of the present invention is directed to calculating a probability that a character, word, or sequence of words will appear next in a given sequence of words, even though the character, word, or sequence of words is not included in the usage history (or are otherwise not known to the system). Continuing with the above example, it might be desirable to determine the likelihood that AC will follow n−1 and if AC is not included in the usage history (e.g., search-parameter corpus), the above formula (i.e., Formula 1) will yield a zero probability. As such, an embodiment of the present invention includes calculating a backoff probability, based on a reduced history of AC. For example, a reduced history includes a probability describing AC regardless of whether the n-gram AC exists in the corpus. An exemplary smoothing technique applies Modified Kneser-Ney smoothing. An exemplary formula that uses a backoff probability and that applies AC includes $$p_{smooth}(C \mid A) = a(A)p(C) = a(A)\frac{18}{25}$$

By applying such a formula, a backoff probability can be determined for the n-gram AC. The backoff probability allows a likelihood that AC will complete n−1 to be compared to the likelihood of ABC, AD, BEC, or C.

In a further embodiment, unknown terms might also be predicted based on a trigger character or trigger character string. For example, continuing with the above example, the entire word represented by C might not be known; however, a trigger character or string of characters might be known. For example, it might be known that C begins with the trigger character "t," and that C is one of four different words that begin with "t". Accordingly, an embodiment of the invention compares the backoff probability of each of the four words that begin with "t." The word beginning with "t" that has the highest backoff-probability value is ranked above the other three words that begin with "t."

An n-gram language model might be implemented using various techniques, such as lazy computation or best first search. Lazy computation is a technique whereby instead of being performed immediately, computations are queued up, and performed when it becomes known that the results of those computations are needed. Best first search is a technique in which one-step extensions to an existing set of paths are explored by considering extensions from the better existing paths prior to considering extensions from inferior existing paths.

Figure 5:
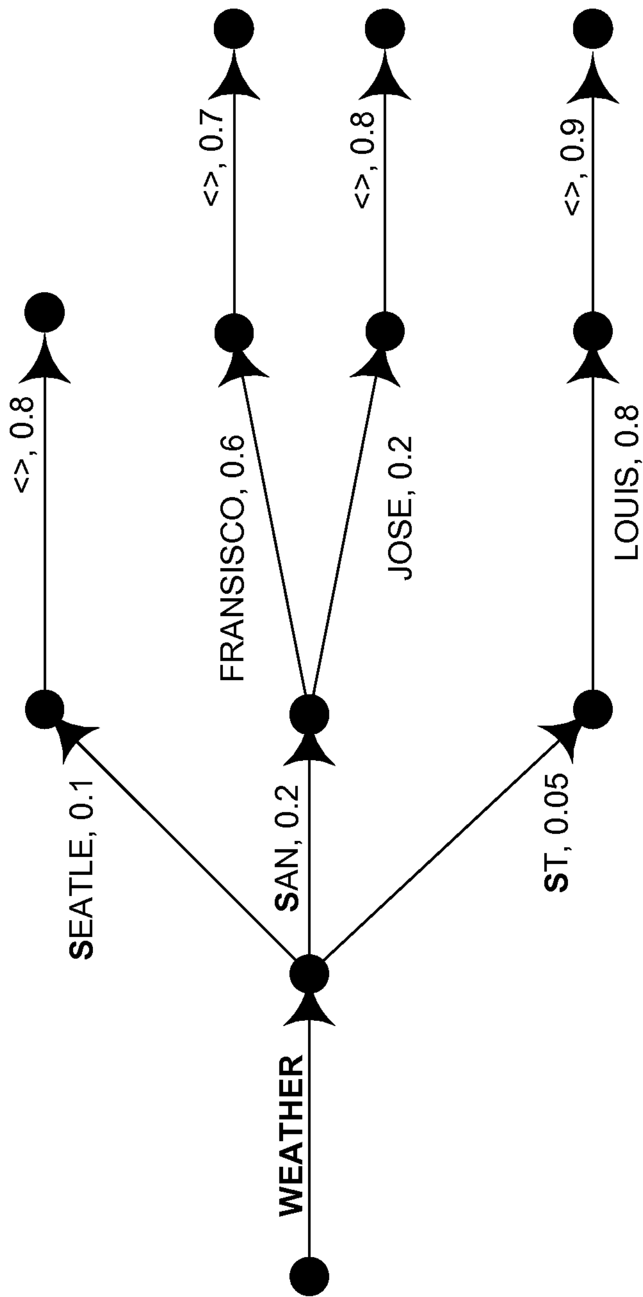
FIG. 5 is a diagram of a query-string tree in accordance with an embodiment of the present invention.

These techniques will be further explained with respect to FIG. 5, in which a user-derived search parameter includes "weather s." Expanding "weather s" might be performed recursively, such that the system will first find: "weather seattle," "weather san," and "weather st." The system will note that "weather seattle" is a complete suggestion but that the other two are not, and so will expand "weather san" and 'weather st." Accordingly, "weather san" is looked up in the model, which produces "weather san francisco" and "weather san jose" both of which are complete. And "weather st" is looked up to find "weather st louis" which is complete. When a "best first search" technique is applied, the best existing (i.e., "weather san" having a probability of 0.8) is expanded first. Such a technique is useful when a limited number of top sequences are desired (e.g., top ten), as the number of potential extensions might be extremely large (e.g., hundreds of thousands). When a "lazy evaluation" technique is applied, instead of immediately expanding the best option, the system notes that such an expansion can be performed and waits to perform until it becomes known that the results of those computations are needed. As such, in the example depicted by FIG. 5, instead of immediately looking up "weather san francisco," the system might note that such a lookup is possible, then it would be compared against other queued options "weather san jose," "weather seattle," and "weather st."

In a further embodiment, search-query assistant 220 includes a suggested-query filter 246. When relying on backoff probability, it is possible to create n-grams that are not relevant (e.g., do not make sense). For example, when completing "jaguar hab" by applying backoff probability, a possible completed sequence might include "jaguar habitat for humanities" (i.e., based on backoff probability of "habitat for humanity"). However, such a possible completed sequence would probably not be helpful. Accordingly, in an embodiment of the present invention, suggested-query filter 246 applies a co-occurrence filter to sequences generated by suggested-query generator. A co-occurrence filter identifies sequences in which sets of suggested terms (e.g., "humanities") together with triggers (e.g., "jaguar") have not co-occurred (e.g. such as in the corpus 222).

In a further embodiment, an exception is allowed to a co-occurrence filter that is based on generated sequences having a high probability. For example, the trigger phrase "12 Angry Men movie tr" might yield a possible completed sequence of "12 Angry Men movie trivia." However, the co-occurrence filter might identify the possible completed sequence as not relevant if "trivia" has not appeared with any of "12," "Angry," or "Men." In this example, if "movie trivia" yields a high probability (e.g., exceeding a probability threshold), suggested-query filter 246 might not apply the co-occurrence filter to "12 Angry Men movie trivia."

In a further embodiment, search-query assistant 220 includes a data-cleanup function that removes noisy parameters and/or generated suggestions. For example, the data-cleanup function might remove some duplicate word endings (e.g., "games games" and "facebook facebook") that are not significant, but leave other duplicate word endings (e.g., "20 20" and "bora bora") that convey meaning. In addition, the data-cleanup function might remove certain prepositional endings (e.g., "of a" and "me in") but leave others (e.g., "sign in" and "log in") that convey a subject. In one embodiment a data-cleanup function operates by compiling a list of all sequences that match a given condition (e.g., duplicate word ending) and that are listed in order of decreasing frequency. Manual inspection of the list allows desirable sequences to be kept, while other undesirable sequences are removed. The data-cleanup function might be applied at various times to parameters in corpus 222. For example, the data-cleanup function might be applied prior to, or after, produced n-grams or suggested search queries.

Although search system 214 is depicted as a single component, search system 214 might comprise a plurality of components that function together to achieve the results described herein. Moreover, although search system 214 is depicted apart from other components of a search engine, in embodiments of the present invention, search system 214 is employed together with any other components that are directed to providing search results.

Within the above described environment 210, an embodiment of the present invention can present a suggested search result. Moreover, the present invention provides a suggested search query in a manner that indicates a use of a search result, which satisfies the suggested search query. Furthermore, the present invention allows a suggested search query to be generated in response to a unique search query, which has not been previously received by a search system (or at least has not been received a threshold number of times). That is, absent the present invention, upon receiving a unique user-devised search parameter or search query (i.e., a query not listed in a query log), a search system might not provide any suggested search result. In contrast, an embodiment of the present invention is directed to providing a suggested search result, despite receiving a unique search query.

Figure 3:
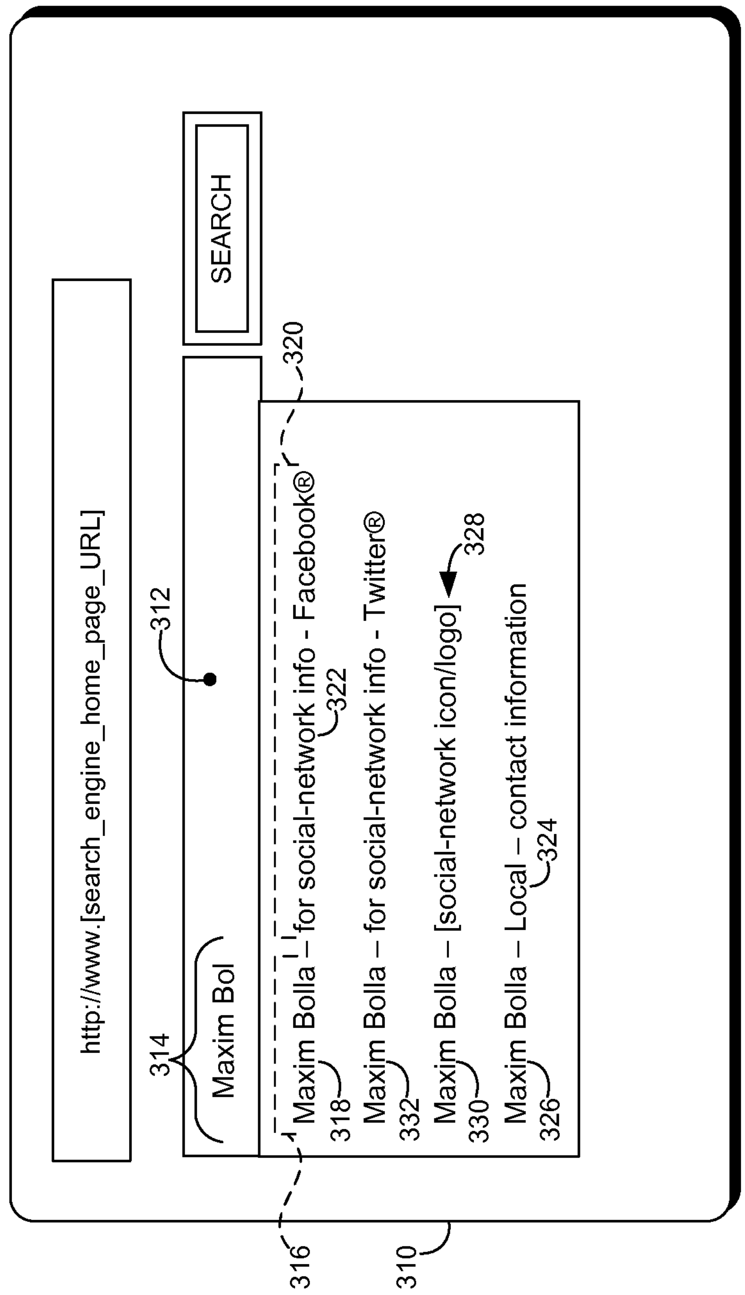
FIG. 3 is an exemplary screen shot in accordance with an embodiment of the present invention.
Figure 4:
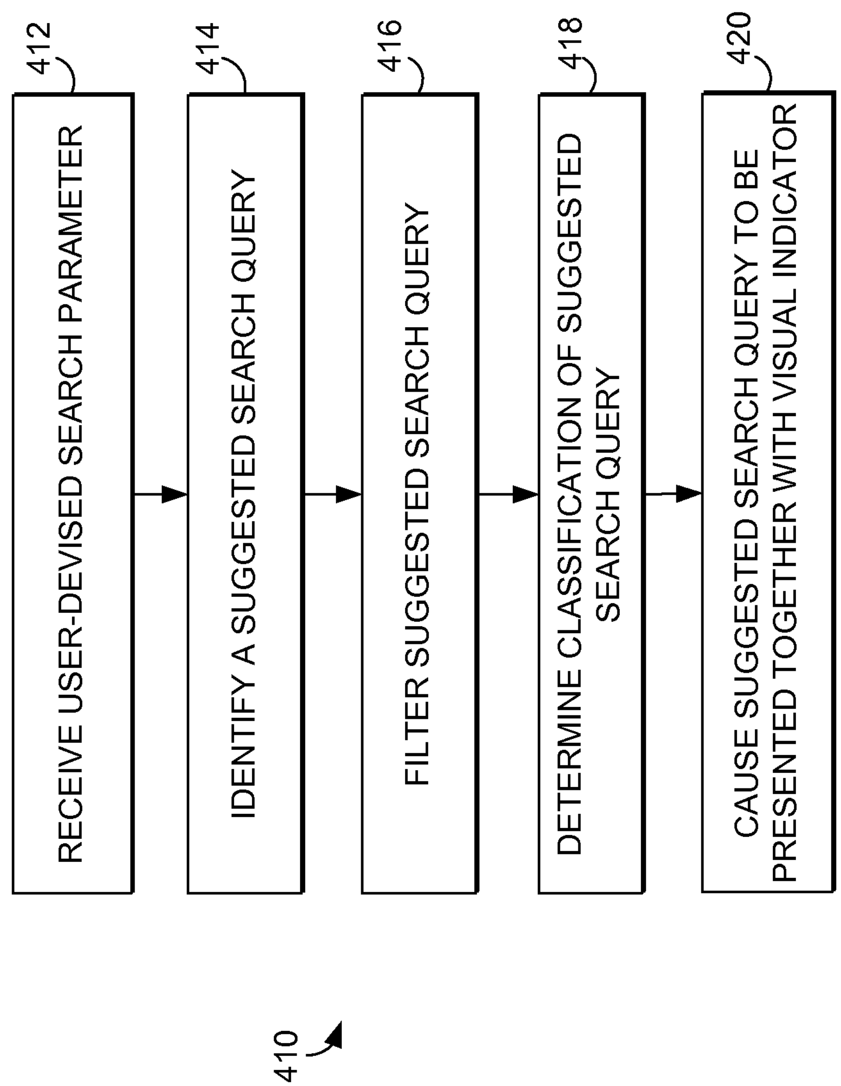
FIG. 4 is an exemplary flow diagram in accordance with an embodiment of the present invention.

Now described is FIG. 4, which depicts a flow diagram of a set operations (identified generally by reference numeral 410) in accordance with an embodiment of the present invention. When describing FIG. 4, reference might also be made to FIGS. 2 and 3. Operations 410 include at 412 receiving a user-devised search parameter. For example, FIG. 2 depicts information 240 being communicated from client 212 to search system 214, and information 240 is labeled as "user-devised search parameter." Moreover, search-query assistant 220 includes search-parameter receiver 242, which functions to receive the user-devised search parameter (e.g., information 240).

Exemplary user-devised search parameters are depicted in FIGS. 2 and 3 (i.e., 254 and 314). A search parameter might include a single character, or a string of characters, that are received by search system 220 as each character is input by a user. For example, in the course of a user inputting user-devised search parameter 254, which includes the parameters "song first day of the rest," a plurality of different parameter sets might be received by search-query assistant 220. That is, as a user inputs "song first day of the rest," a first received parameter set might include a single character "s," and a second received parameter set might include a string of characters "song." Moreover, a received parameter set might include all of "song first day of the rest."

In a further embodiment, operation 414 includes identifying a suggested search query. For example, search-query assistant 220 includes search-query generator 244, which functions to generate a suggested search query. As previously described, a suggested search query might be identified in real time, such as in response to a user-derived query. Alternatively, a suggested search query might be generated prior to receipt of a user-derived search query in an effort to enhance possible queries maintained in corpus 222.

Search-query generator 244 might identify a suggested search query using various techniques, such as by referencing search-parameter corpus 222. For example, the user-devised search parameter might match at least a portion of a search query that is stored in query log (i.e., information 226). Accordingly, the search query might be retrieved from the query log, such that the search query can be provided to client 212 as a suggested search query. Search-query generator 244 might also reference trending queries of information 228 to retrieve a suggested search query. In one embodiment, a trending query is retrieved as a suggested search query regardless of whether the user-devised search parameter matches any portion of the trending query.

In a further embodiment of the present invention, a suggested search query is identified by referencing a structured data source (e.g., 231). That is, structured data source 231 includes information that is indexed in an organized manner to assist with reference and retrieval. For example, a user-devised search parameter might be directed to a particular class of information (e.g., names or music), such that a structured data source of information falling under that particular class can be referenced to identify a suggested search query. Such a body of content enhances the search-parameter corpus 222 to include a larger body of parameters (i.e., as opposed to just information 226 and/or 228) from which to pull suggested search queries. That is, structured data source 231 provides a body of parameters from which to identify suggested search queries that might not have previously been received by search system 214. As previously described, search system 214 might apply higher trust to information retrieved from structured data source 231, as opposed to information retrieved from a log of user-derived search queries. In an exemplary embodiment, search-query assistant 220 assumes that, based on a nature of structured data source 231 (i.e., a trusted source of information), suggested search queries that are pulled from structured data source 231 are desirable queries (i.e., do not have to be filtered or cleaned). For example, search-query assistant 220 might not apply an adult-term filter or a co-occurrence filter.

In an embodiment of the present invention, a user-devised search parameter might match all, or a portion of, parameters that are stored in search-parameter corpus 222. For example, the user-devised search parameter might match parameters stored in query log (e.g., 226) or trending queries (e.g., 228). Such a match between a user-devised search parameter and a query log might be more common with popular user-devised search parameters (e.g., dictionary).

In an alternative embodiment, a user-devised search parameter might not match parameters that are stored in search-parameter corpus 222, such that the user-devised search parameter is a unique query. As such, identifying a suggested search query might include applying an n-gram language model to the unique query to generate a potential search query.

For example, user-devised search query 254, which includes "song first day of the rest," might not be included in search-parameter corpus 222. However, instead of not providing any suggested search result, an n-gram language model might be applied to "song first day of the rest," to generate a potential search query. Applying an n-gram language model in this manner allows for generating a unique suggested search query, which is not a previously suggested search query, such that the unique suggested search query is dynamically created in response to receiving the unique query. An n-gram might language model might operate in various manners. For example, a received user-devised search parameter that includes "song first day of the rest," might be a unique query. However, applying an n-gram language model (e.g., backoff probability) might identify a link between "song" and "lyrics," such that a suggested search query might include "song first day of the rest lyrics" 253. Moreover, applying an n-gram language model (e.g., backoff probability) might identify a link between "first day of the rest" and "of your life," such that a suggested search query might include "song first day of the rest of your life" 255.

Operation 416 includes filtering the suggested search queries. For example, search-query assistant 220 includes suggested-query filter 246, which communicates with suggested query generator 244. Suggested-query filter 246 might apply a filter (e.g., co-occurrence filter, duplicative filter, preposition filter, etc) to suggested search queries to separate out any suggested search queries that might not be helpful to a user. For example, a duplicative filter might be applied to suggested search queries to separate out any suggested search queries that include a search parameter more than once. Moreover, a co-occurrence filter might be applied to filter any queries in which a suggested parameter does not co-occur (i.e., in a corpus) with a user-derived parameter. Another filter might separate out any suggested search queries that include a nonsensical combination of words.

Operation 418 includes determining a classification of the suggested search query. For example, search-query assistant 220 includes suggested-query classifier 248, which identifies a classification of suggested search queries. A classification suggests why a user might want to select a suggested search query and/or how the suggested search query might enable the user to achieve an objective. In an embodiment of the present invention, determining the classification includes applying a classifier to the suggested search query. A classifier includes a component that has been trained using a machine-learning technique and a known sample of classified suggested search result to recognize the classification. In an alternative embodiment, determining a classification includes retrieving classification information from a structured data source. For example, as previously described when information is indexed in a structured data source, the information might be associated with a classification (e.g., name, movie, medical term, geographical location, etc.). As such, classification information stored in a structured data source can be leveraged.

Various classifications might be identified to describe a suggested search query. For example, a classification might include "trending," which suggests that a user is being presented with the suggested search query because of a recent influx in submission of the suggested search query. That is, a trending classification suggests to a user what search queries are being executed by other users at a present moment. Another exemplary classification includes "news," which suggests that a subject matter of the suggested search query has recently been reported by news sources.

A search-result task classification might also be identified that suggests how search results, which satisfy a search query, might be useful to a user. Exemplary search-query tasks include shopping, travel, local, health, entertainment, news, sports, recipes, finding job listings, reference (e.g., dictionary, thesaurus, etc.), real estate, investments, events, social-network information, technology, school, and family. Each of these exemplary search-query tasks might be useful to a user in a respective manner. For example, if a "shopping" task is identified to classify a search query (e.g., LCD TV), the shopping task suggests that search results, which satisfy the search query, might assist a user with finding shopping-related information, such as for buying a product, researching a product, or trying to locate warranty information. Each of these examples (i.e., buying a product, researching a product, and trying to locate warranty information) represents a respective sub-task, which might also be identified. In another example, if a "local" task is identified to classify a search query (e.g., Joe's coffee shop), the local task suggests that search results, which satisfy the search query, might assist a user with finding local information, such as a local address, directions, or contact information (e.g., phone number or website). Again each of these examples (i.e., finding a local address and finding local contact information) represents exemplary respective sub-tasks, which might also be identified. In a further example, if an "entertainment" task is identified to classify a search query (e.g., song first day of the rest of your life), the entertainment task suggests that search results, which satisfy the search query, might assist a user with finding entertainment-related information, such as music downloads, lyrics, videos, playlists, etc. Again each of these examples (i.e., music downloads, lyrics, videos, and playlists) represent exemplary respective sub-tasks, which might also be identified. In another instance, if an "social-network information" task is identified to classify a search query (e.g., name of an individual), the social-network information task suggests that search results, which satisfy the search query, might assist a user with finding social-network information, such as a Facebook® page or a Twitter® blog related to the name of the individual. The above are merely examples of tasks and any variety of other tasks might be identified. Moreover, the any variety of other tasks might include various subtasks.

In an embodiment of the present invention, a search query might be classified prior to the search query being selected as a suggested search query. For example, a search query maintained in search-parameter corpus 222 might be classified any time after the search query is stored, such that when the search query is identified as a suggested search query, the search query has already been classified and can be processed accordingly. In an alternative embodiment, a unique suggested search query, which is dynamically created in response to receiving a unique query, might be classified in real time prior to being communicated to a client device.

Operation 420 includes causing the suggested search query to be presented together with a visual indicator, which suggests the classification of the suggested search query. For example, FIG. 2 depicts information 249 and 251 being communicated from search system 214 to client 212. Information 249 is labeled as "suggested search query" and information 251 is labeled as "visual indicator." In an embodiment of the present invention a visual indicator signifies a search-result task. For example, visual indicator 260 (on screen shot 250) signifies a search-result task, which includes "for Entertainment—Music." That is, search-result task 260 signifies an "Entertainment" search-result task, and a "music" subtask. In such an example, search-result task 260 indicates how search results, which satisfy the suggested search query 252, might be used towards a user objective. The various exemplary search-result tasks and subtasks illustrated in FIG. 2 are depicted as a set of text; however, a visual indication might also include an icon signifying a use of a search result, which satisfies the suggested search query. Moreover, a visual indicator might include any other indication (e.g., text coloring) that visually signifies a classification of a suggested search query.

Another embodiment of the present invention includes one or more computer-readable media having computer executable instructions stored thereon that, when executed, implement a graphical user interface (GUI) for presenting suggested search queries. An output rendering pursuant to an exemplary GUI is depicted in FIG. 3, which depicts a screen shot 310, similar to screen shot 250 of FIG. 2. In an embodiment of the present invention, a GUI includes a search-query input portion, which presents a user-devised search parameter. For example, FIG. 3 depicts search-query input portion 312, which presents user-devised search parameter 314. A GUI might also include a suggested-search-query output portion, which presents a suggested search query. For example, FIG. 3 depicts suggested-search-query output portion 316, which presents a suggested search query 318. In a further embodiment, a GUI includes a visual-indicator output portion, which presents a visual indicator that signifies a classification of the suggested search query. For instance, FIG. 3 depicts visual-indicator output portion 320, which presents visual indicator 322 that signifies a classification of the suggested search query 318. FIG. 3 depicts an exemplary embodiment in which, using the GUI visual indicator 322 is presented together with suggested search query 318.

FIG. 3 depicts a further embodiment in which a visual indicator 324 includes a set of text indicating a use of a search result, which satisfies suggested search query 326. Alternatively, a visual indicator might include an icon 328 (such as social-network logo) signifying a use of a search result, which satisfies suggested search query 330. Moreover, as depicted in FIG. 3, using a GUI of the present invention, a plurality of suggested search queries 318, 326, 330, and 332 might be presented, each of the plurality of suggested search queries including a same suggested search query (e.g., "Maxim Bolla"). However, even though the same suggested query is included, a first suggested search query 318 of the plurality includes a first visual indicator 322, and a second suggested search query 326 of the plurality includes a second visual indicator 324, which is different than the first visual indicator 326.

An embodiment of the present invention is directed to a method of presenting a suggested search query as an option to be submitted to a search system. The method includes, receiving a user-devised search parameter. Responsive to receiving the user-devised search parameter, the suggested search query is identified and a classification of the suggested search query is determined. The suggested search query is caused to be presented together with a visual indicator, which suggests the classification of the suggested search query.

Another embodiment includes one or more computer-readable media having computer executable instructions stored thereon that, when executed, facilitate a method of presenting a suggested search query as an option to be submitted to a search system. The method includes receiving a user-devised search parameter, which does not match a previously received search query. An n-gram language model is applied to the user-devised search parameter to dynamically generate a unique suggested search query, which does not match a previously suggested search query. A classifier is applied to the unique suggested search query to determine a classification of the unique suggested search query. The unique suggested search query is caused to be presented together with a visual indicator, which signifies the classification of the unique suggested search query.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of presenting a suggested search query as an option to be submitted to a search system, the method comprising:

applying a machine-learning technique to train a classifier to assign a classification to a search query, wherein training the classifier generates a machine-learned algorithm;

receiving a user-devised search parameter;

responsive to receiving the user-devised search parameter, identifying the suggested search query that is presented regardless of whether the suggested search query matches any portion of the user-devised search parameter;

applying the machine-learned algorithm to the suggested search query to identify a classification, which describes a type of search results that would be generated if the suggested search query is submitted to a search engine, wherein the machine-learned algorithm is applied by the classifier;

causing the suggested search query to be presented together with a visual indicator, which suggests the classification of the suggested search query;

wherein the visual indicator indicates that the suggested search query is a trending search query, which has been received by a search system in a quantity that is higher than an average submission rate.

2. The method of claim 1, wherein the user-devised search parameter is a unique query, which is not recognized by the search system as a previously received search query.

3. The method of claim 2, wherein the previously received search query is listed on a query log of the search system.

4. The method of claim 1, wherein identifying the suggested search query includes applying an n-gram language model to the unique query to generate a potential search query.

5. The method of claim 4, wherein the potential search query is a unique suggested search query, which is not a previously suggested search query, such that the unique suggested search query is dynamically created in response to receiving the unique query.

6. The method of claim 1, wherein applying the machine-learning technique to train includes submitting to the classifier a sample of suggested search results in which each suggested search result includes a known classification.

7. The method of claim 1, wherein the suggested search query is identified from a search-parameter corpus, which includes a structured data source.

8. The method of claim 7, wherein the structured data source includes indexed information that has been retrieved from a webpage.

9. The method of claim 8, wherein the information is retrieved using a customized crawler, which is programmed to determine an information type under which the information is categorized in the structured data source, and wherein the information type is used to determine the classification.

10. Computer-storage media storing computer executable instructions thereon that, when executed, facilitate a method of presenting a suggested search query as an option to be submitted to a search system, the method comprising:

receiving a user-devised search parameter;

responsive to receiving the user-devised search parameter, identifying the suggested search query that is presented regardless of whether the suggested search query matches any portion of the user-devised search parameter;

applying the machine-learned algorithm to the suggested search query to identify a classification, which indicates the suggested search query is trending, wherein the machine-learned algorithm is applied by the classifier;

causing the suggested search query to be presented together with a visual indicator, which suggests the classification of the suggested search query, wherein the visual indicator indicates that the suggested search query is a trending search query, which has been received by a search system in a quantity that is higher than an average submission rate.

11. The computer-storage media of claim 10 further comprising, identifying an n-gram of the user-devised search parameter that is not included in a corpus of previously submitted search queries in combination with the user-devised search parameter;

calculating a backoff probability of the n-gram, which is used to determine whether the n-gram and the user-defined search parameter should be combined to create a unique suggested search query that does not match any search queries included in the corpus of previously submitted search queries;

applying a classifier to the unique suggested search query to determine a classification of the unique suggested search query; and causing the unique suggested search query to be presented together with another visual indicator, which signifies the classification of the unique suggested search query, wherein the classification of the unique suggested search query includes a search-results task, which is pursuable using search results that satisfy the unique suggested search query.

12. The computer-storage media of claim 11, wherein the other visual indicator signifies the search results task.

13. The computer-storage media of claim 11, wherein the search-results task includes a subtask, and wherein the subtask includes a subtask indicator that is presented together with the visual indicator.

14. The computer-storage media of claim 10, wherein the visual indicator, which is presented together with the suggested search query, includes a set of text.

15. The computer-storage media claim 10, wherein the visual indicator, which is presented together with the unique suggested search query, includes an icon.

16. The computer-storage media of claim 1, wherein the visual indicator includes a set of text indicating a use of a search result, which satisfies the suggested search query.

17. The computer-storage media of claim 1, wherein the visual indicator includes an icon signifying a use of a search result, which satisfies the suggested search query.

18. The computer-storage media of claim 1, wherein a plurality of suggested search queries are presented;

wherein the plurality of suggested search queries include a same suggested search query;

wherein a first suggested search query of the plurality includes a first visual indicator; and wherein a second suggested search query of the plurality includes a second visual indicator, which is different than the first visual indicator.

* * * * *